United States Patent [19]

Torrington

[11] 4,316,539
[45] Feb. 23, 1982

[54] VIDEO DISC CADDY

[75] Inventor: Leslie A. Torrington, Indianapolis, Ind.

[73] Assignee: RCA Corporation, New York, N.Y.

[21] Appl. No.: 214,854

[22] Filed: Dec. 10, 1980

[51] Int. Cl.³ .................. B65D 85/57; G11B 5/82; G11B 25/04
[52] U.S. Cl. .................. 206/307; 206/312; 206/444; 360/133; 369/77
[58] Field of Search .......... 206/307, 303, 312, 313, 206/444; 360/133; 274/9 B; 220/4 B

[56] References Cited

U.S. PATENT DOCUMENTS

| | | | |
|---|---|---|---|
| 3,908,824 | 9/1975 | Takahara et al. | 206/312 |
| 3,951,264 | 4/1976 | Heidecker et al. | 260/444 |
| 4,084,694 | 4/1978 | Lainez et al. | 206/444 |
| 4,159,827 | 7/1979 | Torrington | 206/444 |
| 4,164,782 | 8/1979 | Stewart | 206/444 |

Primary Examiner—William T. Dixson, Jr.
Attorney, Agent, or Firm—E. M. Whitacre; J. S. Tripoli; D. A. Kulkarni

[57] ABSTRACT

A video disc caddy comprises a jacket and a record retaining spine. The jacket includes a U-shaped rigid frame having a peripheral edge wall and an intermediate flange extending inwardly from the edge wall at substantially right angles thereto. The intermediate flange in conjunction with the interior surfaces of the edge wall defines a pair of channels. A pair of inexpensive panels, made from sheet stock, are securely mounted in the respective channels to define a record enclosing cavity.

10 Claims, 9 Drawing Figures

VIDEO DISC CADDY

This invention relates generally to a package for a video disc record, and more particularly, to a video disc caddy package which allows insertion of a record into a player (and subsequent retrieval) without touching the record.

In certain systems, video information is stored on a disc record in the form of geometric variations in a continuous spiral track disposed on the record surface. The variations in capacitance between an electrode carried by a record-engaging stylus and a conductive property of the record are sensed to reproduce the stored information. A capacitance-type pickup system is illustratively disclosed in U.S. Pat. No. 3,842,194 (Clemens).

In one video disc system, the record is enclosed in a caddy which comprises an outer jacket and a record retaining spine. The spine is provided with an opening in which a record is received forming a record/spine assembly. For record loading, a full caddy is inserted into the player along side rails. A record extraction mechanism disposed in the player removes the record/spine assembly from the jacket for retention in the player on a set of receiving pads during subsequent jacket withdrawal. To transfer the record to the turntable for playback, the turntable is raised relative to the receiving pads. The player is provided with hold-down members which hold the spine in place while allowing the record to be picked up by the turntable when it is raised. During playback, the pickup stylus is traversed radially across the record while the turntable rotates the record at the desired speed (e.g., 450 rpm). For record retrieval, the record is transferred back to the receiving pads by lowering the turntable with respect to the receiving pads to redefine the record/spine assembly. An empty jacket is then reinserted into the player, whereby the record/spine assembly is retrieved into the jacket. U.S. patent application, Ser. No. 98,412, entitled "VIDEO DISC CADDY", filed for C. F. Coleman et al., illustrates a caddy-type video disc system.

A cost-effective caddy construction, pursuant to the present invention, is herein disclosed. The caddy jacket comprises a U-shaped spacer element made from relatively rigid material. The spacer element has a peripheral wall and a substantially perpendicularly-disposed rib extending inwardly from the peripheral wall. The perpendicularly-disposed rib forms a pair of shelves in cooperation with the peripheral wall. A pair of panels, made from relatively inexpensive sheet stock, are secured to the respective one of the shelves to define a record enclosing cavity.

Figure 1:
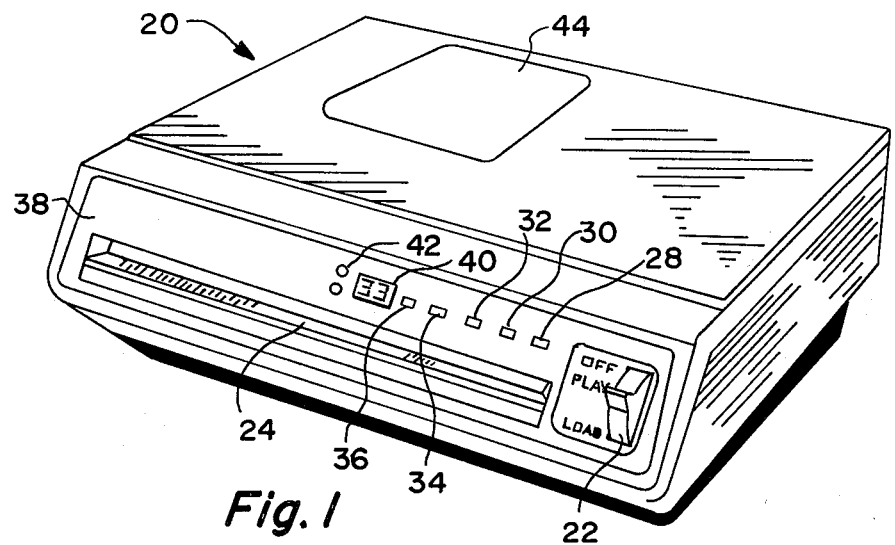
FIG. 1 shows a video disc player suitable for use with a video disc caddy in accordance with this invention.
Figure 2:
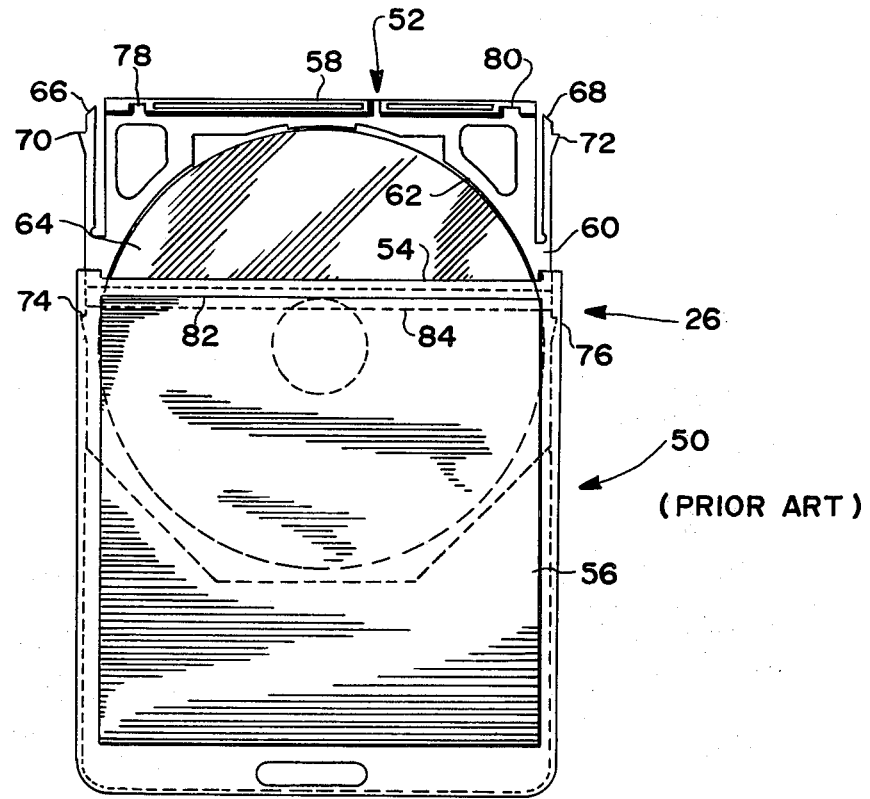
FIG. 2 illustrates a prior art video disc caddy comprising a record retaining spine and a jacket.
Figure 3:
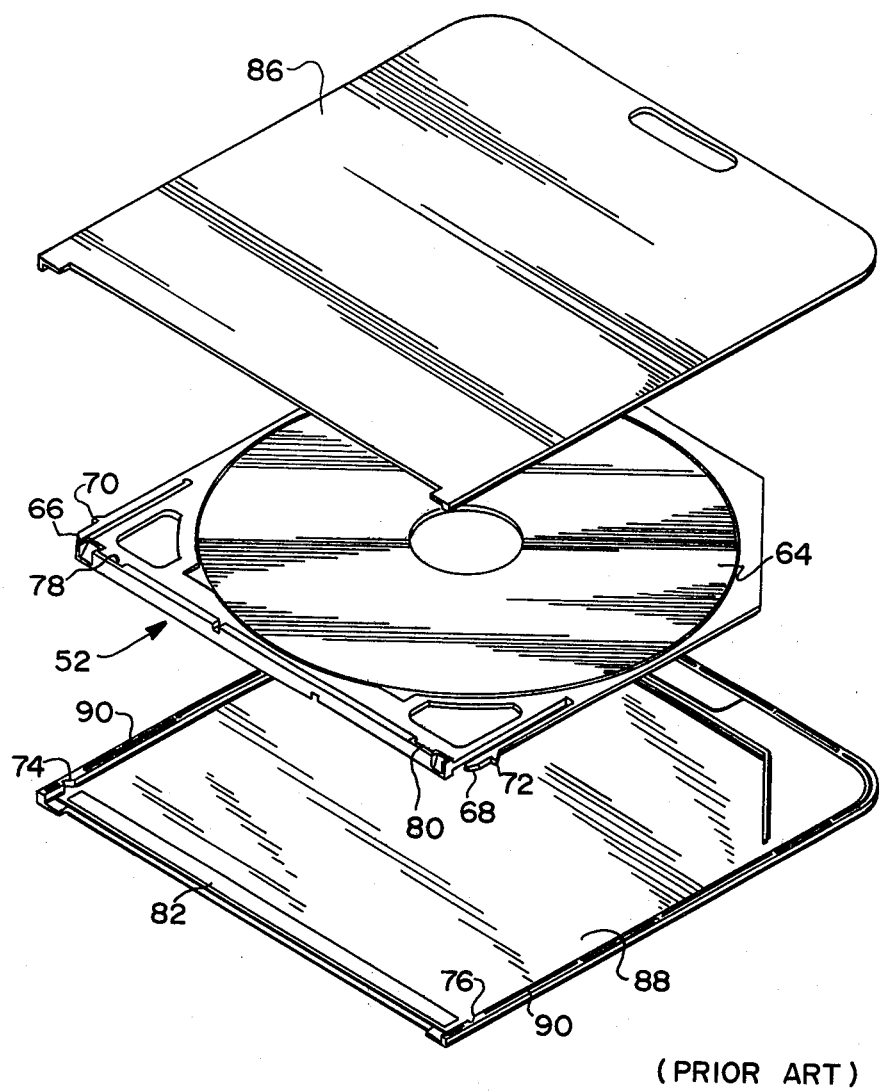
Figure 4:
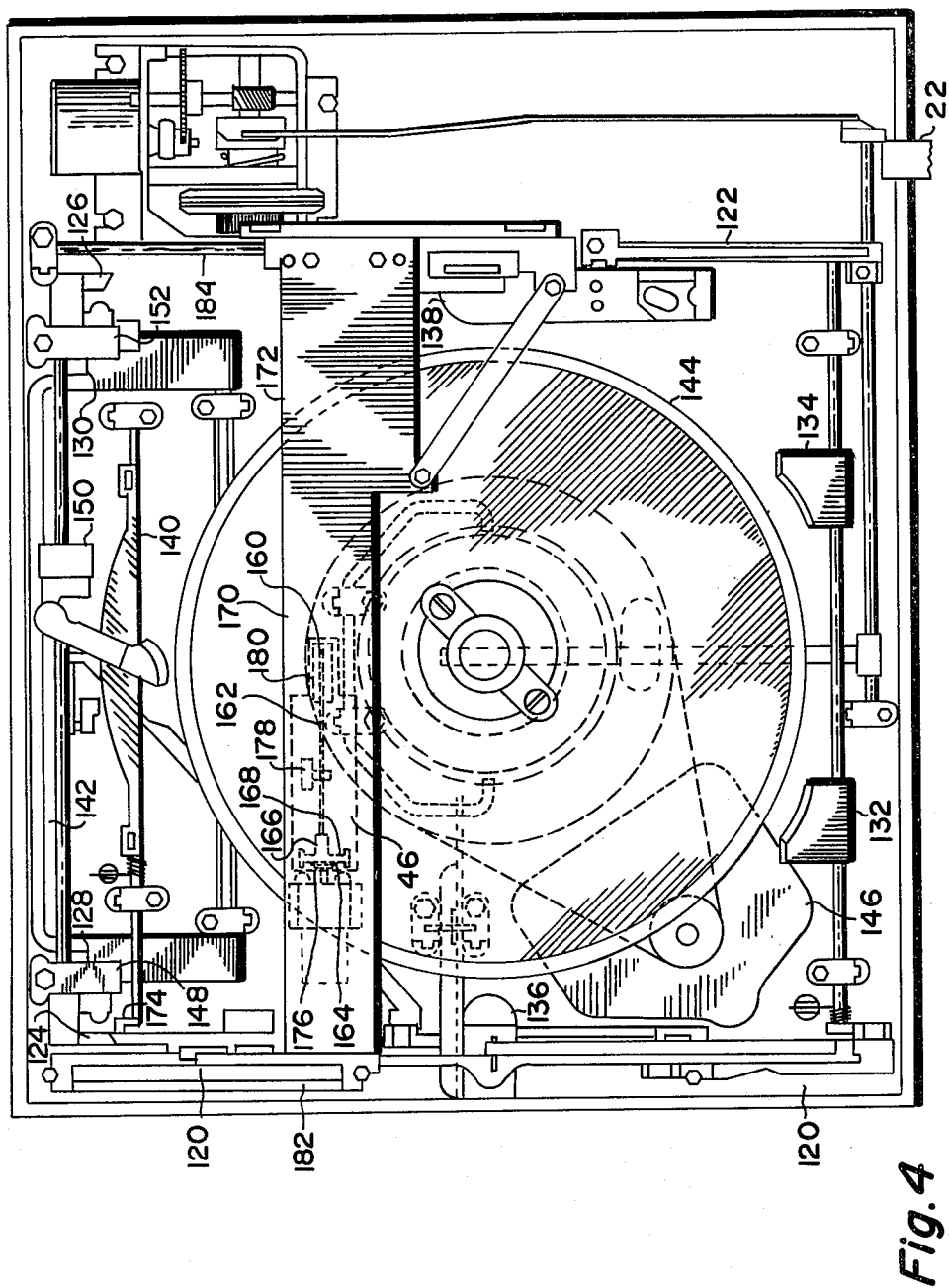
Figure 5:
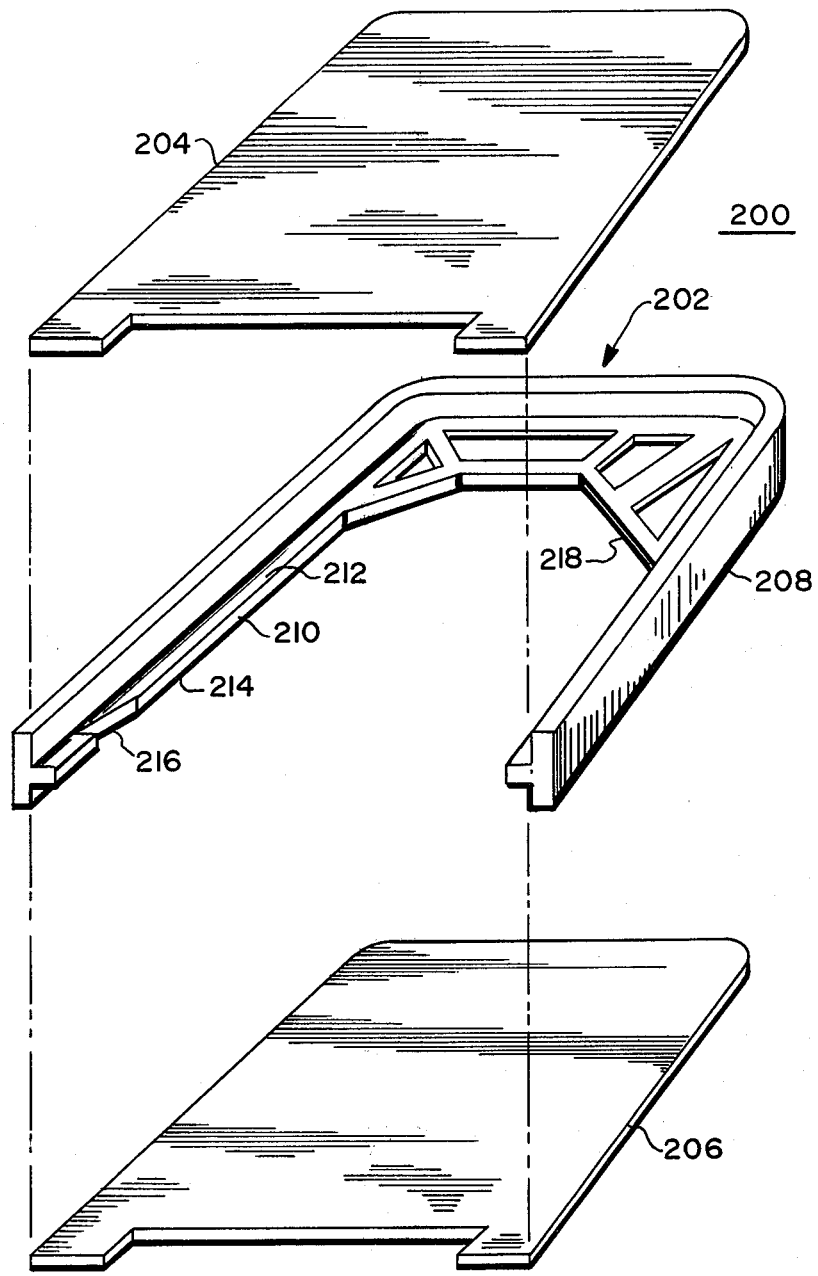
Figure 6:
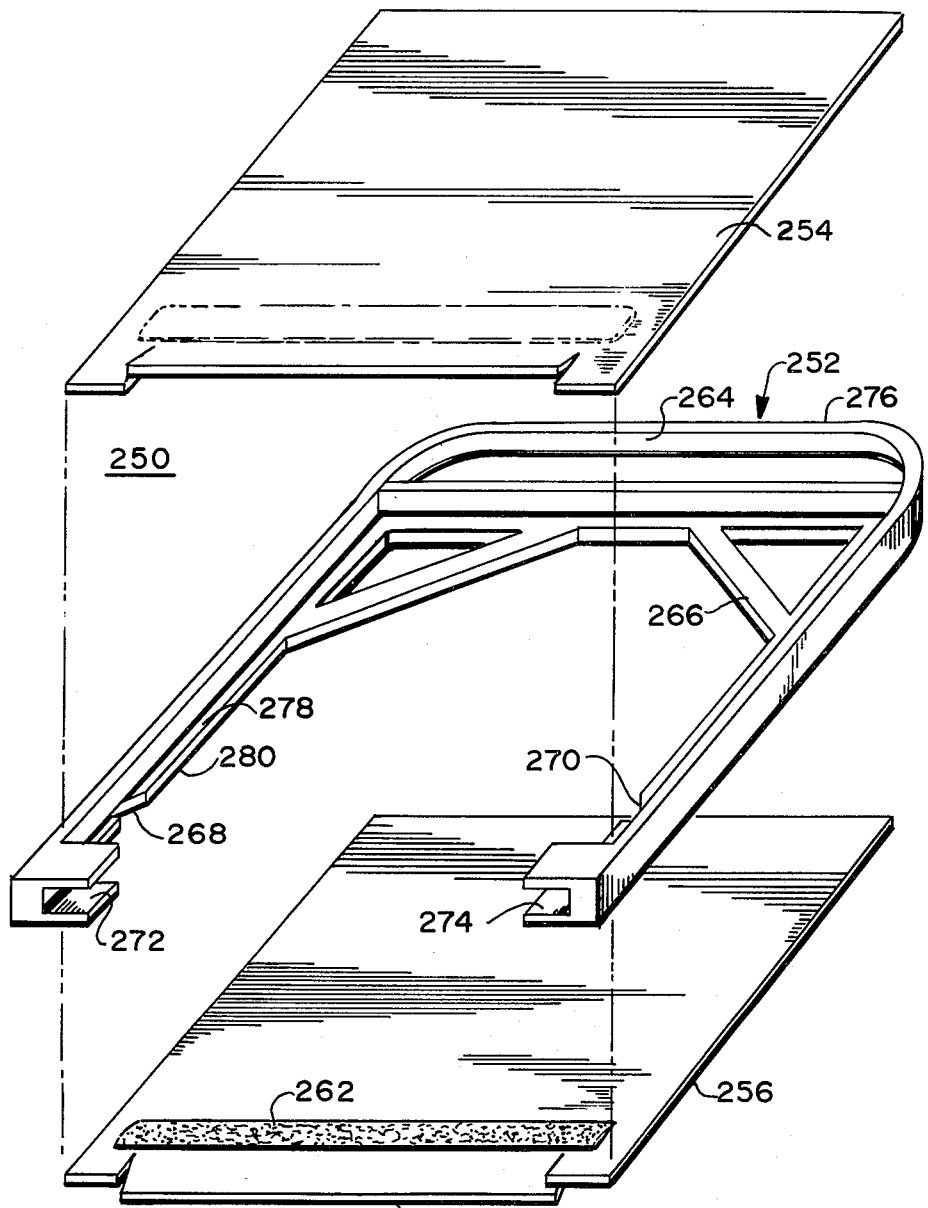
Figure 7:
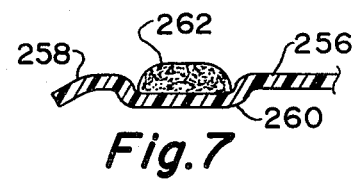
Figure 8:
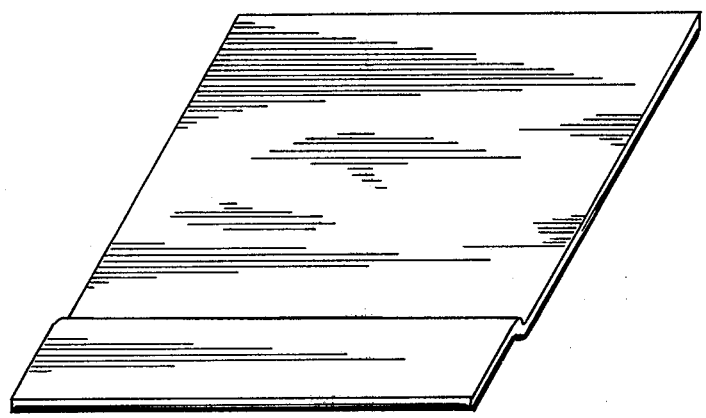

FIG. 3 provides an exploded perspective view of the prior art caddy of FIG. 2;

FIG. 4 is a top view of the player of FIG. 1 with its cover removed to expose underlying details;

FIG. 5 depicts an exploded perspective view of a jacket, comprising a rigid support element and a pair of inexpensive covers, pursuant to the subject invention;

FIG. 6 represents an exploded perspective view of another embodiment of the instant invention;

FIG. 7 is a partial cross sectional view of the cover of FIG. 6;

FIG. 8 illustrates an alternative cover design; and

Figure 9:

FIG. 9 provides a partial cross sectional view of the FIG. 8 cover.

Shown in FIG. 1 is a video disc player 20 suitable for use with a video disc caddy according to the present invention. A function lever 22 is subject to disposition in any one of three positions—OFF, PLAY and LOAD/UNLOAD. A door flap closes a caddy input slot 24 when the function lever 22 is disposed in the OFF and PLAY positions. In the LOAD/UNLOAD position of the function lever 22, the door flap is opened to permit insertion of a video disc caddy 26 into the player to load an enclosed record therein. A pushbutton 28 is provided to dispose the player in the "PAUSE" mode. A set of pushbuttons 30, 32, 34 and 36 are arranged on the instrument panel 38 to dispose the player in any one of four "SEARCH" modes, i.e., rapid access (forward/reverse) and visual search (forward/reverse). A digital readout 40 provides an indication of playing time and other functions, such as PAUSE, LOAD/UNLOAD and END-OF-PLAY, etc. A pair of tally lights 42 are operated to provide an indication of the record side subject to play, e.g., "SIDE 1" and "SIDE 2". A door 44 is disposed on the cover of the player to provide access to a stylus cartridge 46 which is shown in FIG. 4.

FIGS. 2 and 3 illustrate a prior art video disc caddy. As shown therein, the video disc caddy 26 comprises a jacket 50 and a substantially planar, record retaining spine 52. The jacket 50 has an edge opening 54 in communication with a cavity 56 for enclosing the record/spine assembly. The spine 52 has a portion 58 which serves as a closure, and a further portion 60 having a circular opening 62 for receiving a centrally-apertured record 64. The spine 52 is further provided with integrally-molded, flexural latch fingers 66 and 68. Each of the spine latch fingers 66 and 68 has a protruding element 70 and 72. The protruding elements 70 and 72 are received in pockets 74 and 76 disposed in the jacket 50 for capturing the spine 52 when it is fully inserted therein. The spine 52 is provided with cutouts 78 and 80 for selectively receiving the spine gripper members mounted in the player to secure the spine thereto in the manner explained later. Disposed inside the jacket 50, near the edge opening 54 thereof, are a pair of lip pads 82 and 84 made from flocculent material. The lip pads 82 and 84 serve to keep the dust and the debris out and to wipe the record each time it is inserted into or withdrawn from the jacket 50. A program label, not shown, is mounted on the outside of the jacket 50.

The operation of the caddy extraction mechanism will now be explained in conjunction with FIG. 4. To load a record into the player, a caddy 26 is guided into the input slot 24 along a path defined by side rails 120 and 122. As the caddy arrives at a fully inserted position in the player, latch defeat members 124 and 126 enter the jacket 50 to defeat the spine latch fingers 66 and 68 for freeing the spine 52 from the jacket. Pivotally mounted in the player are spine gripper members 128 and 130 which are received in the respective cutouts 78 and 80, arranged in the spine 52, when the caddy arrives at the fully inserted position in the player in order to lock the spine to the player. Since the spine 52 is released from the jacket 50 through the operation of the latch defeat members 124 and 126 and is latched to the player through the operation of the spine gripper members (e.g., 130), subsequent withdrawal of the jacket leaves the record/spine assembly in the player. The retained record/spine assembly is supported on a set of depressible receiving pads 132, 134, 136, 138 and 140. A pair of springs (not shown) disposed between a gripper arm 142, which carries the spine gripper members 128 and 130, and the latch defeat members 124 and 126 effect downward deflection of the latch defeat members upon jacket withdrawal.

To transfer the retained record to a turntable 144, the function lever 22 is displaced to the PLAY position, which, in turn, raises the turntable and starts a turntable motor 146. A set of hold-down members 148, 150 and 152 hold the retained spine 52 in place against the receiving pads 132, 134, 136, 138 and 140 while permitting the retained record to be intercepted by the turntable 144 when it is raised. The hold-down members 148, 150 and 152 also serve to accurately locate the retained spine 52, longitudinally and laterally, in the player.

A pickup stylus 160 is disposed at one end of a stylus arm 162, the other end of which is secured to a latch plate 164 by means of a rubber coupler 166. The latch plate 164, in turn, is suspended in the cartridge 46 by means of a rubber diaphragm 168. The cartridge 46 is placed in a compartment 170 provided in a stylus arm carriage 172, and the carriage lid, not shown, is closed. Disposed in the carriage 172 is a slidably-mounted arm-stretcher transducer 174 (e.g., of the type described in U.S. Pat. No. 3,983,318) which is provided with a latch cup 176 subject to engagement with the latch plate 164. The transducer 174 is advanced in response to the closure of the cartridge lid to establish connection between the latch plate 164 and the latch cup 176.

A stylus arm lifting/lowering mechanism 178 (for example, of the general variety shown in U.S. Pat. No. 4,053,161) is mounted in the carriage 172 to selectively lower the pickup stylus 160 through an opening 180 provided in the bottom wall of the carriage to effect record engagement. During playback, the carriage 172 is translated on guide ways 182 and 184 disposed parallel to the caddy side rails 120 and 122 from a starting position at the back of the player toward the front of the player in synchronism with the radially inward motion of th pickup stylus 160. The variations in capacitance between an electrode carried by the stylus 160 and a conductive property of the record 64 are sensed to reproduce the stored information on the record. The recovered signals are processed to reconstruct a television signal containing picture and sound information for application to a television receiver.

To transfer the record back to the receiving pads 132, 134, 136, 138 and 140 after playback, the function lever 22 is depressed to the LOAD/UNLOAD position, which, in turn, lowers the turntable 144 to a level below the receiving pads. When the turntable 144 is lowered, the record is deposited on the receiving pads 132, 134, 136, 138 and 140 for reception in the opening 62 disposed in the spine 52 to redefine the record/spine assembly. The turntable motor 146 is shut off when the function lever 22 is displaced to the LOAD/UNLOAD position. The location of the receiving pads 132, 134, 136, 138 and 140, occupying the raised position thereof, is such that the record/spine assembly is aligned with the center line of the caddy side rails 120 and 122.

To retrieve the record/spine assembly, the empty jacket 50 is inserted into the player through the input slot 24 along the caddy side rails 120 and 122. As the jacket 50 arrives as the fully inserted position, the front edge thereof engages the already deflected latch defeat members 124 and 126 to cause further downward deflection thereof. Such further downward deflection of the latch defeat members 124 and 126, in turn, effects downward displacement of the spine gripper members 128 and 130, whereby the spine 52 is freed from the player. When the jacket 50 is fully inserted into the player, the protruding elements 70 and 72 of the spine latch fingers 66 and 68 snap back into the pockets 74 and 76 to lock the spine 52 to the jacket. The record/spine assembly is withdrawn from the player when the caddy is extracted.

The prior art jacket, shown in FIG. 3, comprises a pair of identical jacket halves 86 and 88 which are molded from relatively rigid plastic material (e.g., medium impact polystyrene). The two jacket halves are ultrasonically welded to each other on three sides to form a record enclosing cavity. Each of the jacket halves is provided with a tongue and groove system 90 along three sides thereof to ensure a good weld joint. The unjoined sides of the jacket halves define an edge opening in communication with the record enclosing cavity.

The cost effective jacket configuration, in accordance with the subject invention, is disclosed in FIGS. 5-9. The record retaining spine, of the type shown in FIGS. 2 and 3, is slipped into the subject jacket to form a caddy assembly suitable for use with the video disc player of the type described in connection with FIG. 4.

The jacket embodiment 200, shown in FIG. 5, comprises a generally U-shaped support member 202 and a pair of panels 204 and 206. The support member is injection molded fron any suitable rigid material, such as, medium impact polystyrene. Alternatively, the support member can be formed from a plastic extrusion. In that case, notching would be desirable in the region of the rear corners to facilitate formation of the corner bends. The panels 204 and 206 are stamped out from any suitable, inexpensive sheet stock, e.g., cardboard, thermoformed polystyrene sheets, laminated sheet stock, etc. If the panels are laminated blanks, the exterior surfaces should desirably be hard to resist wear and tear, and the interior surfaces should preferably be soft and smooth to properly interface with the enclosed disc.

The U-shaped support member 202 comprises a peripheral wall 208 and an intermediate ledge 210 extending inwardly from the peripheral wall substantially at right angles thereto. The intermediate ledge 210 defines a pair of channels 212 and 214 in conjunction with the interior surfaces of the peripheral wall 208. The two panels 204 and 206 are securely bonded to the respective one of the channels 212 and 214 in the support member 202 by any suitable means, e.g., adhesive joint, weld joint, etc. A pair of notches (only one can be seen in FIG. 5, identified by numeral 216) are disposed on the ledge 210 to releasably capture a record retaining spine in the manner described above. A plurality of reinforcing ribs 218 are provided to further augment the structural rigidity of the support member 202.

FIG. 6 illustrates an alternative embodiment of the instant jacket. The jacket 250 comprises a molded center frame 252 and a pair of thermoformed sides 254 and 256. Each of the sides 254 and 256 has a turned out portion 258, in the manner shown in FIG. 7, in the vicinity of the open end of the jacket 250 to define a lead-in section. Each of the sides 254 and 256 has a transverse recess 260, near the front edge of the jacket 250, into which a strip 262 of flocculent material is glued to provide a pair of lip pads for wiping the record as it is inserted into and removed from the jacket 250. The sides 254 and 256 are provided with a uniform cross-section, in the manner indicated in FIG. 7, to facilitate the thermoforming process.

The center frame 252 is provided with a finger recess 264, support ribs 266, and molded-in latch recesses 268 and 270. The center frame 252 has cored front ends 272 and 274, as shown in FIG. 6, for actuating various levers and cams disposed along the guide rails 120 and 122 in the player in the above-indicated manner. The back edge 276 of the center frame 252 is provided with program identification information. The thermoformed sides 254 and 256 are ultrasonically welded to the channels 278 and 280 disposed in the center frame 252. FIGS. 8 and 9 illustrate an alternative design for the thermoformed panels.

Many variations are contemplated and included in the present invention. For example, the two panels can be integral. Likewise, it is possible to provide the peripheral edge wall only along the two opposed sides of the frame, while providing the intermediate flange on three sides. The panels, in that case, can be extended all the way back to the rear edge of the center frame.

The subject jacket construction produces substantial cost savings because of high production cycle rates inherent in the design and due to the use of inexpensive panel materials.

what is claimed is:

1. A package for a disc record comprising:
   (A) a substantially U-shaped frame made from relatively rigid material; said U-shaped frame having an edge wall and an intermediate flange extending inwardly from said edge wall; said flange being disposed generally perpendicularly to said edge wall; the interior surfaces of said edge wall in cooperation with said intermediate flange defining a plurality of channels; and
   (B) a pair of panels made from sheet material; each of said panels being securely mounted in the respective ones of said channels in said frame; the interior surfaces of said intermediate flange and said panels forming a record enclosing cavity.

2. The package as defined in claim 1 wherein the open end of said U-shaped frame and the front edges of said panels defining an edge opening in communication with said record enclosing cavity.

3. The package as defined in claim 1 further including a planar record retaining spine subject to slidable reception in said record enclosing cavity; said spine having an opening for receiving a record; said package having means for releasably capturing said spine within said record enclosing cavity.

4. The package as defined in claim 1 wherein said frame is molded from plastic material.

5. The package as defined in claim 1 wherein said frame is formed from a plastic extrusion.

6. The package as defined in claim 1 wherein said panels comprise blanks of cardboard material.

7. The package as defined in claim 1 wherein said panels comprise blanks of thermoformed plastic sheet material.

8. The package as defined in claim 1 wherein said edge wall extends along three sides of said U-shaped frame.

9. The package as defined in claim 1 wherein said edge wall extends only along two opposed sides of said U-shaped frame.

10. The package as defined in claim 1 wherein said panels are defined by a single piece of sheet material.

* * * * *